Patented Jan. 26, 1932

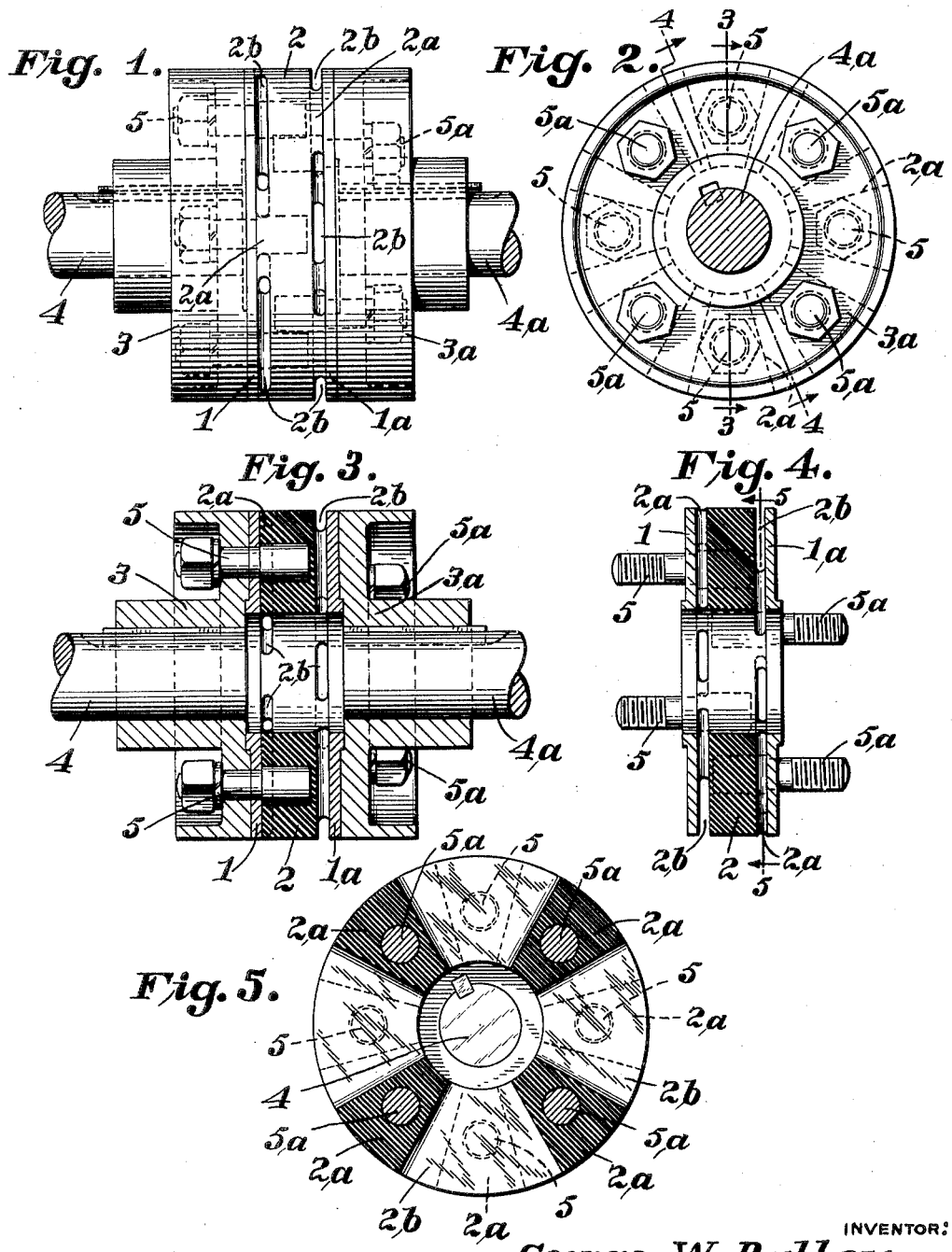

1,842,582

UNITED STATES PATENT OFFICE

GEORGE W. BULLEY, OF AKRON, OHIO, ASSIGNOR, BY MESNE ASSIGNMENTS, TO THE MILLER RUBBER COMPANY INC., OF WILMINGTON, DELAWARE, A CORPORATION OF DELAWARE

FLEXIBLE SHAFT COUPLING

Application filed June 29, 1929. Serial No. 374,889.

My said invention relates to improvements in universal or flexible joints or couplings for shafts and the like.

The invention aims to provide a simple, economical and efficient joint which may be cheaply and efficiently manufactured and which will be extremely durable in use, and which will be free from any relatively moving parts requiring lubrication or protection from dust and the like.

The invention further aims to provide a coupling of the type using flexible or resilient non-metalic material as the connecting means which will avoid the necessity of any rivets or like means serving to connect the flexible or resilient material to the metal parts.

With these and other objects in view, the invention comprises the novel construction hereinafter described and defined by the appended claims.

Figure 1 is a side elevation,
Fig. 2 a face view of Fig. 1, and
Fig. 3 is a section on line 3—3 of Fig. 2.
Fig. 4 is a section on line 4—4 of Fig. 2, and
Fig. 5 is a section on line 5—5 of Fig. 4.

In the preferred embodiment of the invention shown, I provide two parallel metal plate or disk members 1 and 1a which are designed to be connected to the respective adjacent ends of the shafts to be coupled. 2 designates the soft or resilient rubber connecting medium which is in the form of an annulus or ring provided on each of its opposite faces with projections 2a and intervening spaces 2b, the projections on one face being staggered with relation to those on the other face, and with the faces of the projections bonded to the respective juxtaposed plates 1 and 1a by vulcanization.

The members 1 and 1a are preferably made of steel electroplated with brass which enables the rubber to be bonded to the metal by vulcanization with a union of such strength that the rubber will tear apart before it will separate from the metal.

The union may be conveniently effected by placing the members 1 and 1a in a mold of suitable shape with the space between the plates filled with soft rubber compound, removable core members being used to form the recesses between the projections, and the closed mold being subjected to the heat necessary to effect vulcanization of the rubber.

While the disk members could be provided with means for directly connecting them to the shafts, I prefer the construction shown which comprises shaft end members 3 and 3a having hubs designed to be secured in any desired manner to the shafts 4 and 4a and to which members the plates 1 and 1a are secured by bolts 5 and 5a which pass through alining openings in the members 1 and 3 and 1a and 3a, respectively. The bolt heads are embedded in the rubber which is vulcanized thereto, the bolts being placed in the disks prior to their insertion in the mold.

The bolts are secured to the members 3 and 3a by nuts and lock washers as shown.

It will be noticed that the projections 2a are of less width than the opposed spaces 2b which allows a lateral deflection of the rubber into the spaces in the working of the coupling.

By the arrangement disclosed, I provide an extremely strong and durable coupling which may be produced at an extremely low cost, and one in which the resiliency of the rubber permits ample flexibility of the coupling and produces no endwise thrust on the shaft members.

I claim:

1. A flexible coupling comprising two spaced apart opposed members, means for connecting them respectively to adjacent shaft ends, and an interposed connecting member of resilient rubber bonded to said members by vulcanization at circumferentially spaced apart intervals and spaced therefrom between the bounded areas, the bonded portions on one side being staggered in relation to those of the other side.

2. A flexible coupling comprising spaced apart opposed members, means for connecting them respectively to adjacent shaft ends, and an interposed connecting member of resilient rubber having projections on its opposite faces with intervening recesses of greater width than the projections, the projections on one face being staggered with relation to those of the other face, said projections being bonded by vulcanization to said opposed members.

3. A flexible coupling comprising a pair of opposed disk like metallic members having bolt openings, bolts passing through the openings and having enlarged heads between said members, a connecting member of resilient rubber bonded by vulcanization to said members, and to said bolt heads, and shaft end connecting means having bolt openings to receive said bolts.

4. In a flexible coupling a driving and a driven metallic part and a connecting member of resilient rubber bonded by vulcanization to said parts at spaced intervals, the bonded connections with one part being staggered with relation to the connections with the other part.

5. A flexible shaft coupling comprising a driving disc, a driven disc, said discs each having driving pins extending toward the other in interspaced non-contacting relation, and a resilient rubber connecting ring element bonded by vulcanization to each of the discs and all of said pins, said ring element being formed with radial openings therethrough between the free end of each pin and the opposite disc.

6. A flexible shaft coupling comprising a driving element, a driven element, said elements each being provided with projections extending toward the other in intercalated isolated relation, and a resilient rubber connecting ring element bonded by vulcanization to the projections on each of the elements and spaced from said elements opposite said projections.

7. A flexible shaft coupling comprising a driving element having a plurality of projecting pins, a driven element having a plurality of projecting pins arranged in intercalated relation to those of the driving element, and an annular resilient rubber connecting member arranged in intercolumnar relation with and bonded to the pins on both elements by vulcanization.

In testimony whereof I affix my signature.

GEORGE W. BULLEY.